(12) United States Patent
Murakami et al.

(10) Patent No.: US 10,461,290 B2
(45) Date of Patent: Oct. 29, 2019

(54) ELECTRIC STORAGE APPARATUS, AND METHOD FOR PRODUCING ELECTRIC STORAGE APPARATUS

(71) Applicant: GS Yuasa International Ltd., Kyoto-shi (JP)

(72) Inventors: Satoshi Murakami, Kyoto (JP); Shinsuke Yoshitake, Kyoto (JP); Hiroaki Kakimura, Kyoto (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 506 days.

(21) Appl. No.: 14/469,780

(22) Filed: Aug. 27, 2014

(65) Prior Publication Data

US 2015/0064545 A1 Mar. 5, 2015

(30) Foreign Application Priority Data

Sep. 2, 2013 (JP) ................................. 2013-181514

(51) Int. Cl.
*H01M 2/10* (2006.01)

(52) U.S. Cl.
CPC ........ *H01M 2/1077* (2013.01); *H01M 2/1016* (2013.01); *H01M 2/1061* (2013.01); *Y10T 29/49904* (2015.01); *Y10T 29/49908* (2015.01)

(58) Field of Classification Search
CPC ............. H01M 2/1016; H01M 2/1061; H01M 2/1077; H01M 2/10; H01M 2/00; H04J 1/00; Y10T 29/49908; Y10T 29/49904
USPC ........................................................ 429/151
See application file for complete search history.

(56) References Cited

U.S. PATENT DOCUMENTS

| 4,174,014 A * | 11/1979 | Bjorksten | B60K 1/04 180/68.5 |
| 5,709,965 A | 1/1998 | Grivel et al. | |
| 2002/0006545 A1* | 1/2002 | Marukawa | H01M 2/0257 429/156 |

(Continued)

FOREIGN PATENT DOCUMENTS

| JP | H 08-39168 A | 2/1996 |
| JP | 8-83598 A | 3/1996 |

(Continued)

OTHER PUBLICATIONS

Machine translation of Watanabe et al. (JP 2013069657 A).*

(Continued)

*Primary Examiner* — Carlos Barcena
*Assistant Examiner* — Suphia Quraishi
(74) *Attorney, Agent, or Firm* — McGinn I.P. Law Group, PLLC.

(57) ABSTRACT

According to an embodiment, an electric storage apparatus includes an electric storage device, an abutment arranged in alignment with the electric storage device, wherein the abutment includes at least three members stacked together, each of the members has a positioning part having a first surface forming a recess and a back surface of the first surface forming a projection, the positioning parts of the members are arranged at positions corresponding to one another, and adjacent members are relatively positioned by inserting a positioning part of one of the adjacent members into a positioning part of the other of the adjacent members.

7 Claims, 10 Drawing Sheets

(56) References Cited

U.S. PATENT DOCUMENTS

| | | | |
|---|---|---|---|
| 2005/0058892 A1* | 3/2005 | Ovshinsky | H01M 2/1077 429/120 |
| 2011/0151309 A1* | 6/2011 | Park | H01M 2/1072 429/151 |
| 2011/0206948 A1 | 8/2011 | Asai et al. | |
| 2012/0052359 A1 | 3/2012 | Yoshitake et al. | |
| 2013/0183571 A1 | 7/2013 | Miyazaki et al. | |
| 2015/0064546 A1 | 3/2015 | Murakami et al. | |
| 2015/0340669 A1* | 11/2015 | Aoki | H01M 2/1077 429/151 |
| 2016/0149180 A1 | 5/2016 | Tokoo et al. | |

FOREIGN PATENT DOCUMENTS

| | | | | |
|---|---|---|---|---|
| JP | 2008-130374 A | 6/2008 | | |
| JP | 2009-150596 A | 7/2009 | | |
| JP | 2011-175743 A | 9/2011 | | |
| JP | 2013-69657 A | 4/2013 | | |
| JP | 2013069657 | * 4/2013 | | H01M 2/10 |
| JP | 2014-203747 A | 10/2014 | | |
| JP | 2015-005362 A | 1/2015 | | |
| JP | 2015-050067 A | 3/2015 | | |
| WO | WO 2010/131700 A1 | 11/2010 | | |
| WO | WO 2012/043594 A1 | 4/2012 | | |
| WO | WO 2014/203694 A1 | 12/2014 | | |

OTHER PUBLICATIONS

English Translation of JP2013069657.*
United States Office Action dated Jun. 2, 2016 in co-pending U.S. Appl. No. 14/471,966.
United States Notice of Allowance dated Oct. 5, 2016 in U.S. Appl. No. 14/471,966.

* cited by examiner

ELECTRIC STORAGE APPARATUS, AND METHOD FOR PRODUCING ELECTRIC STORAGE APPARATUS

CROSS-REFERENCE TO RELATED APPLICATION

This application claims the benefit of Japanese Patent Application No. 2013-181514, filed on Sep. 2, 2013, which is incorporated herein by reference.

FIELD

The present invention relates to an electric storage apparatus that includes an electric storage device, and a method for producing an electric storage apparatus.

BACKGROUND

An electric storage apparatus provided with a plurality of electric storage devices is used, for example, for electric cars, because of the requirement for a high-capacity power source. As shown in FIG. 10, the electric storage apparatus of this type includes a plurality of electric storage devices 120 aligned in a specific direction and a pair of end parts 102 that sandwich the plurality of electric storage devices 120 (see JP 2008-130374 A). The end parts 102 are plate members made of resin. In such an electric storage apparatus 100, the plurality of electric storage devices 120 are firmly fixed to each other by increasing the plate thickness so as to sufficiently ensure the strength of the end parts 102.

In recent years, there is a demand for a reduction in size of electric storage apparatuses. However, the size of the electric storage apparatus 100 increases if the strength of the end parts 102 is ensured by increasing the plate thickness of the end parts 102 as in the electric storage apparatus 100. Therefore, it is conceivable that the thickness of the end parts 102 is suppressed while ensuring the strength of the end parts 102 by stacking a plurality of thin members reinforced by providing ribs, or the like, so as to form each of the end parts 102.

However, in this case, since the plurality of members are stacked to form the single end part 102, the number of parts increases, and the operation such as positioning of the members relative to one another is complicated. Therefore, the operation efficiency in assembling the electric storage apparatus 100 is reduced. Particularly, in the case where the end part 102 is formed by stacking three or more members, the operation such as positioning is more complicated, and the operation efficiency in assembling the electric storage apparatus 100 is significantly reduced.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Aspects of the present invention provide an electric storage apparatus, and a method for producing an electric storage apparatus, which facilitates the assembly.

An electric storage apparatus according to an aspect of the present invention includes: an electric storage device; and an abutment arranged in alignment with the electric storage device, wherein the abutment includes at least three members stacked together, each of the members has a positioning part having a first surface forming a recess and a back surface of the first surface forming a projection, the positioning parts of the members are arranged at positions corresponding to one another, and adjacent members are relatively positioned by inserting a positioning part of one of the adjacent members into a positioning part of the other of the adjacent members.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
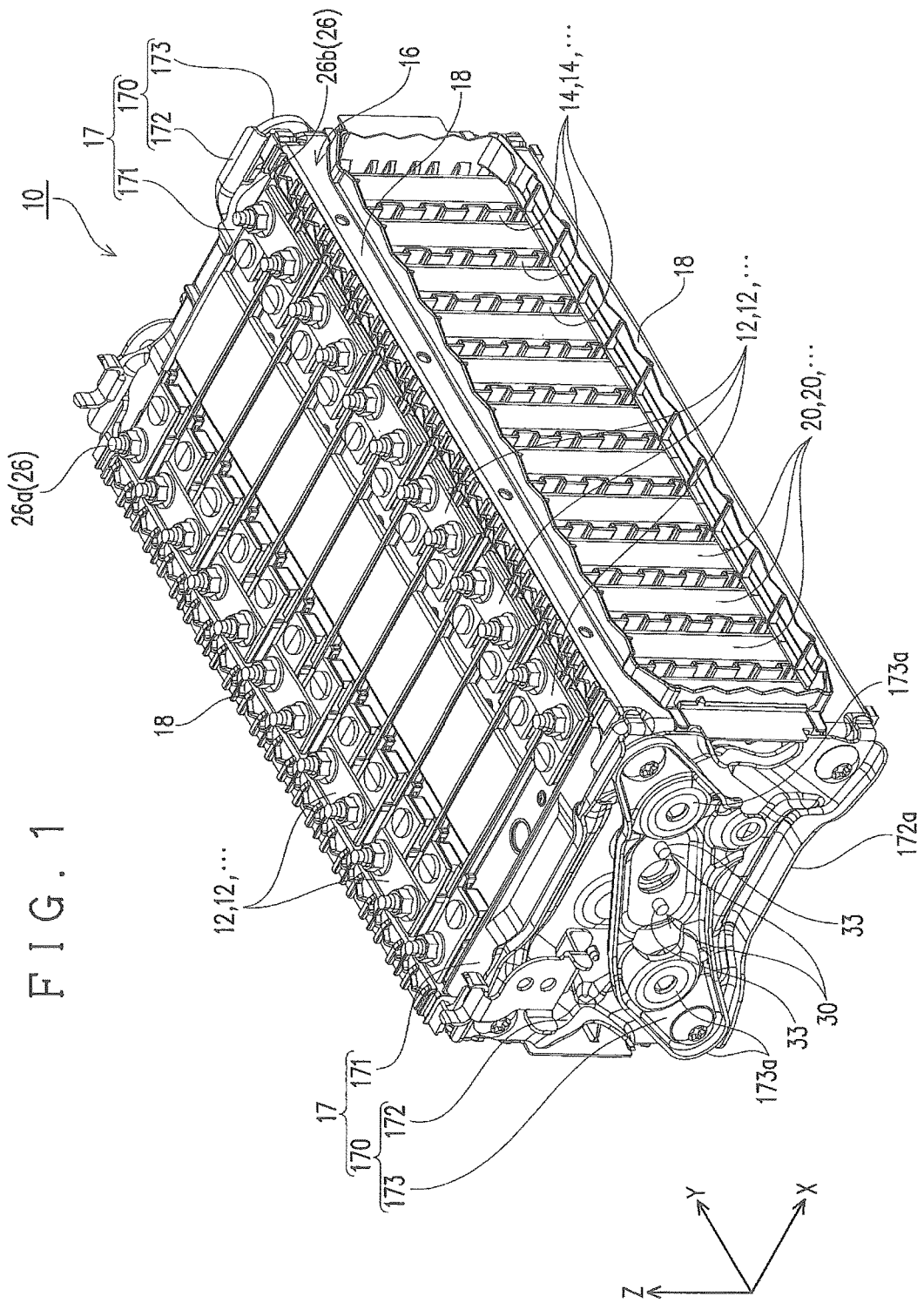
FIG. 1 is a perspective view of a battery module.

An electric storage apparatus according to an aspect includes: an electric storage device; and an abutment arranged in alignment with the electric storage device, wherein the abutment includes at least three members stacked together, each of the members has a positioning part having a first surface forming a recess and a back surface of the first surface forming a projection, the positioning parts of the members are arranged at positions corresponding to one another, and adjacent members are relatively positioned by inserting a positioning part of one of the adjacent members into a positioning part of the other of the adjacent members.

According to such a configuration, the positioning part of one of the adjacent members is inserted into the positioning part of the other of the adjacent members, thereby facilitating the positioning of the members relative to one another when forming the abutment. As a result, the assembly of the electric storage apparatus is facilitated.

In the electric storage apparatus, each of the members preferably includes a plurality of positioning parts mentioned above.

According to such a configuration, the positioning parts of one of the adjacent members are respectively inserted into their corresponding positioning parts of the other of the adjacent members, thereby determining the attitude of the members relative to each other. Therefore, the assembly of the electric storage apparatus can be further facilitated. That is, the projections of the plurality of positioning parts of the other of the adjacent members, which correspond to the recesses of the plurality of positioning parts of one of the adjacent members, are respectively inserted into the recesses, thereby making it possible to prevent the relative rotation of the members about a single recess and the projection inserted into the recess. This can further facilitate the assembly operation.

Further, the electric storage apparatus may have a configuration in which one of the at least three members that is arranged on the most electric storage device side is an insulating member, and the others of the at least three members are made of metal.

According to such a configuration, the electric storage device can be insulated from the members made of metal.

The electric storage apparatus may have a configuration in which each of the members made of metal includes a metal plating layer on its surface.

According to such a configuration, as compared to the case where the members made of metal are positioned, for example, by welding, damage to the metal plating layer can be suppressed.

The electric storage apparatus may have a configuration in which a projecting surface of a positioning part of the insulating member is fitted into a recessed surface of a positioning part of the member made of metal that is adjacent to the insulating member.

According to such a configuration, the positioning part of the insulating member projecting toward the member made of metal is inserted into the positioning part of the member made of metal. Accordingly, the distance between the insulating member and the electric storage device is shortened so that the size of the electric storage apparatus can be reduced.

The electric storage apparatus may have a configuration in which the projecting surface of the positioning part of the insulating member includes an outer circumferential surface of a circular cylindrical shape, and the recessed surface of the positioning part of the member made of metal includes an inner circumferential surface of a circular cylindrical shape that is arranged concentrically with the outer circumferential surface so as to surround the outer circumferential surface.

According to such a configuration, the formation of the positioning parts is facilitated.

The electric storage apparatus may have a configuration in which the projecting surface of the positioning part of the insulating member includes an outer circumferential surface, the recessed surface of the positioning part of the member made of metal includes an inner circumferential surface that is arranged concentrically with the outer circumferential surface so as to surround the outer circumferential surface, and the outer circumferential surface and the inner circumferential surface arranged concentrically with each other have a diameter decreasing toward the distal end of the projection of the positioning part.

According to such a configuration, the formation of the positioning parts is facilitated.

Further, in the electric storage apparatus, it is preferable that the recess of the positioning part of one of the adjacent members have a recess-side large-diameter portion, on the bottom side, with an inner circumference larger than an opening of the recess, the projection of the positioning part of the other of the adjacent members have a projection-side large-diameter portion, on the distal end side of the projection, with an outer circumference larger than the opening, the projection-side large-diameter portion being arranged inside the recess-side large-diameter portion.

According to such a configuration, it is difficult for the projection-side large-diameter portion inserted into the recess of the positioning part to pass through the opening of the recess. Therefore, the at least three members constituting the abutment can be handled as a single part by engaging the adjacent members to each other using the positioning parts, thereby facilitating the assembly of the electric storage apparatus.

Further, the electric storage apparatus may have a configuration in which the positioning parts are formed by partially pressure molding the at least three members in a stacked state at a time.

According to such a configuration, the positioning parts of the members are integrally formed by pressure molding, and thus the looseness between the joined members can be suppressed. Further, the positioning parts that correspond to one another are formed at a time by pressure molding, and therefore the relative position can be suppressed from deviating, for example, due to manufacturing errors, as compared to the case where the engaging parts are formed by separate steps.

According to another aspect, a method for producing an electric storage apparatus that includes an electric storage device and an abutment arranged in alignment with the electric storage device includes: using at least three members each having a positioning part that has a first surface forming a recess and a back surface of the first surface forming a projection; and forming the abutment by inserting a positioning part of one of adjacent members of the at least three members into a positioning part of the other of the adjacent members.

The method for producing an electric storage apparatus may be configured so that the positioning parts of the members are formed by partially pressure molding the at least three members in a stacked state at a time.

The method for producing an electric storage apparatus may be configured so that one of the at least three members that is arranged on the most electric storage device side is an insulating member, and the others of the at least three members are made of metal.

The method for producing an electric storage apparatus may be configured so that each of the members made of metal has a metal plating layer on its surface.

Hereinafter, an embodiment of the present invention is described with reference to FIG. 1 to FIG. 7. In the following description, the X axis direction of FIG. 1 indicates a width direction, the Y axis direction thereof indicates a front-rear direction, and the Z axis direction thereof indicates a height direction.

Figure 2:
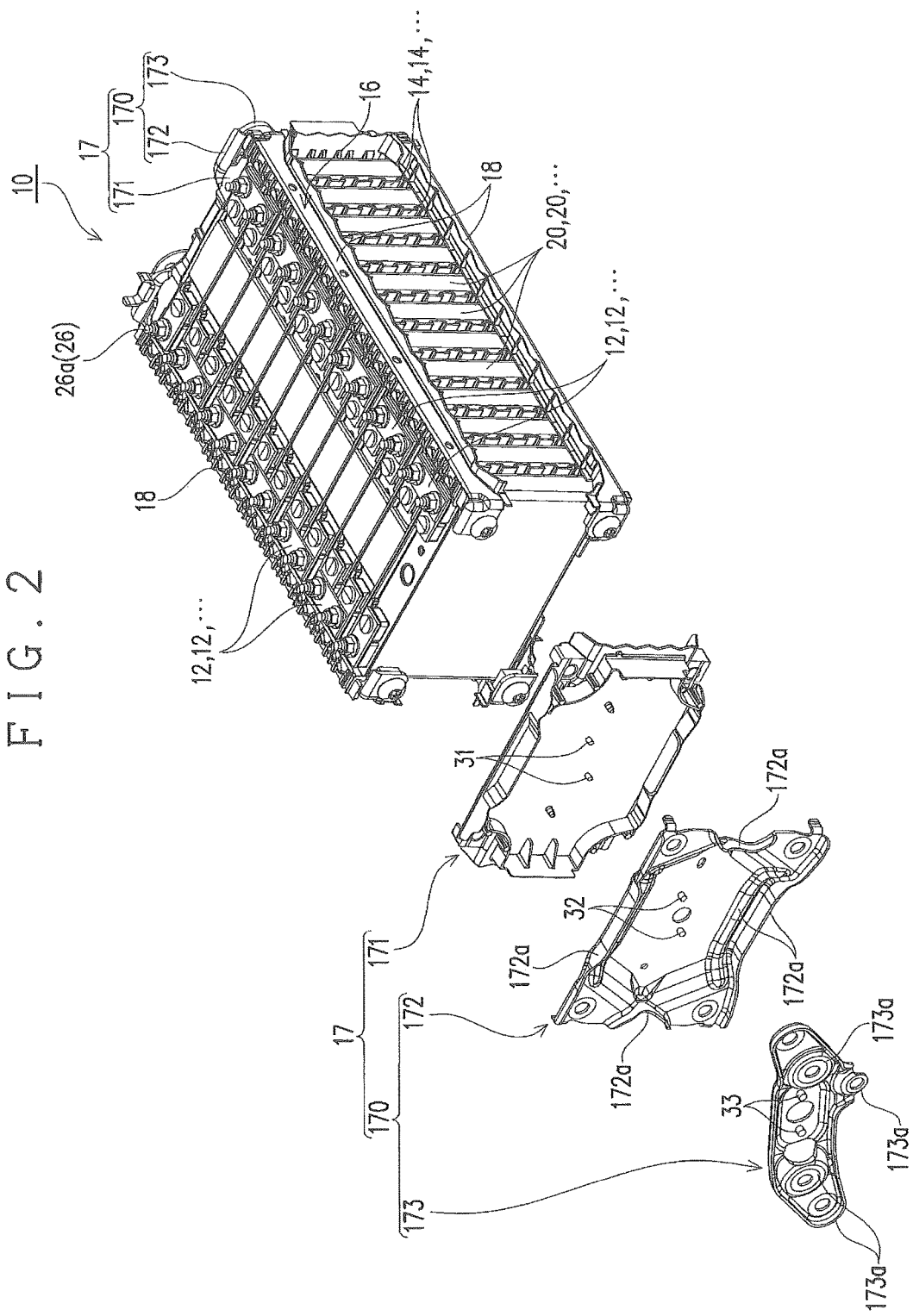
FIG. 2 is an exploded perspective view of part of the battery module.

The electric storage apparatus according to this embodiment is a battery module including battery cells as electric storage devices. As shown in FIG. 1 to FIG. 2, this battery module includes a plurality of battery cells (electric storage devices) 20, a plurality of bus bars 12, a plurality of spacers 14, and a frame 16.

The plurality of battery cells 20 are arranged in alignment in a specific direction (front-rear direction in this embodiment). The plurality of battery cells 20 have the same structure and the same shape. Hereinafter, one of the battery cells 20 is described.

Figure 3:
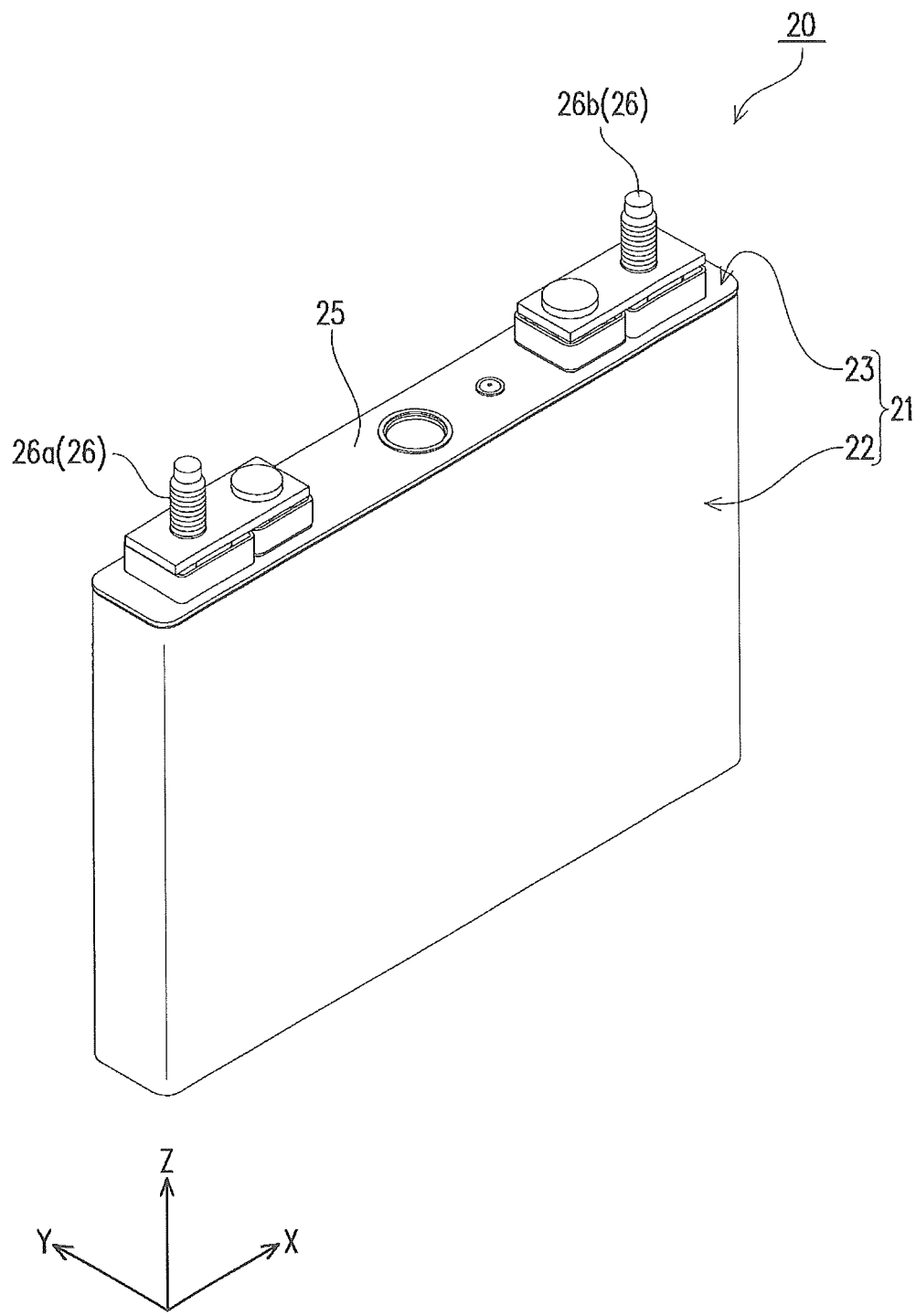
FIG. 3 is a perspective view of a battery cell included in the battery module.
Figure 4:
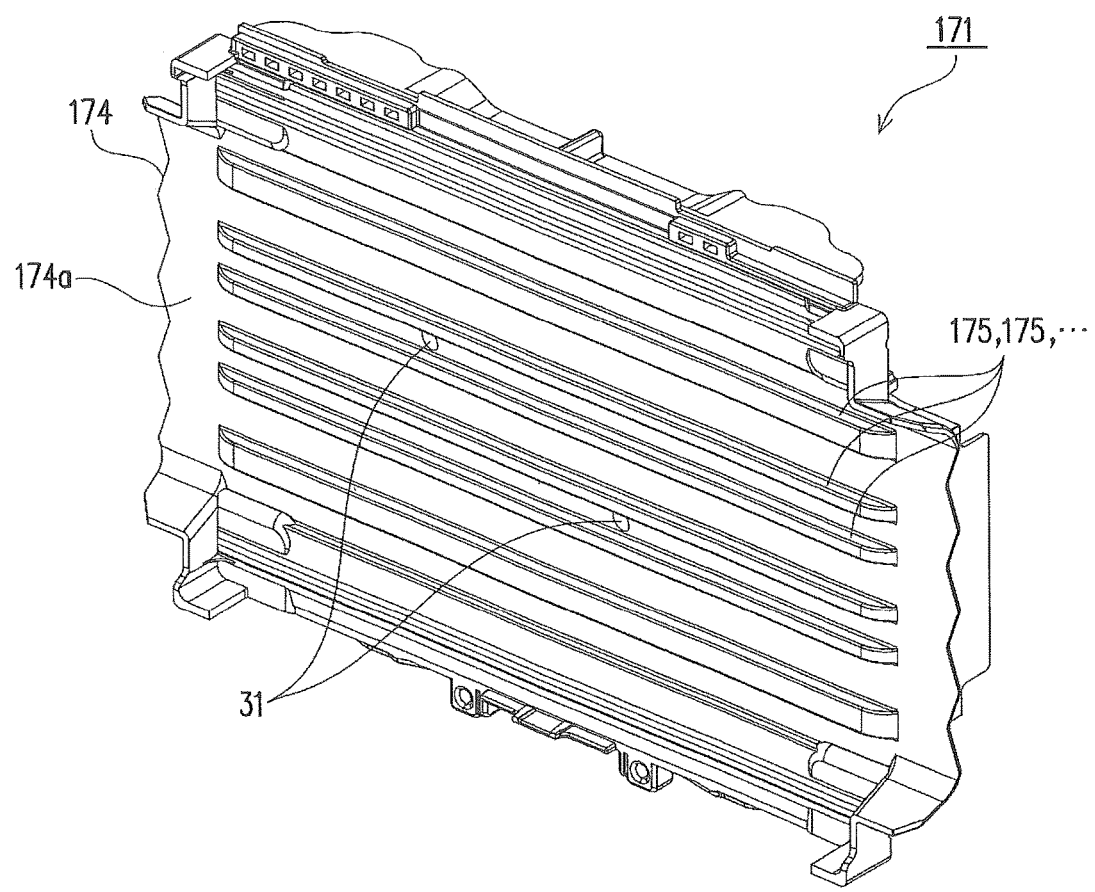
FIG. 4 is an enlarged perspective view of an insulating member included in the battery module.

As shown in FIG. 3, the battery cell 20 includes an electrode assembly (not shown), and a case 21 housing the electrode assembly.

The case 21 has a case body 22 and a cover 23, and houses the electrode assembly in an internal space surrounded by the case body 22 and the cover 23. The case body 22 has a bottomed rectangular cylindrical shape flattened in the width direction. The cover 23 has a cover plate 25 configured to close an opening of the case body 22, and a pair of external terminals 26 attached to the cover plate 25. One of the pair of external terminals 26 is a positive electrode-external terminal 26a connected to a positive electrode of the electrode assembly, and the other external terminal is a negative electrode-external terminal 26b connected to a negative electrode of the electrode assembly.

Each of the bus bars 12 electrically connects the external terminals 26 of adjacent battery cells 20 that correspond to each other (specifically, the positive electrode-external terminal 26a of one of the battery cells 20 and the negative electrode-external terminal 26b of the other of the battery cells 20). The bus bar 12 of this embodiment, for example, is a rectangular plate member made of metal.

Returning to FIG. 1 to FIG. 2, each of the spacers 14 is arranged between adjacent battery cells 20. The spacer 14 is formed of a synthetic resin and has insulating properties. The spacer 14 of this embodiment is formed to have a longitudinal cross section of a rectangular wave shape. The spacer 14 having such a shape is arranged between the adjacent battery cells 20, thereby allowing the air to circulate between the battery cells 20.

The frame 16 holds the plurality of battery cells 20 and the plurality of spacers 14 arranged between the battery cells 20 so as to package them. The frame 16 has abutments 17 as a pair of terminal ends arranged at a distance in the front-rear direction, and a plurality (four in an example of this embodiment) of coupling members 18, extending in the front-rear direction, configured to couple the pair of abutments 17 to each other.

The pair of abutments 17 are coupled to each other by the plurality of coupling members 18, thereby sandwiching the plurality of battery cells 20 in the front-rear direction so as to fix them. Each of the abutments 17 has at least three members stacked together. The abutment 17 of this embodiment has a sandwiching member 170 composed of a plurality of molded metal plates and an insulating member 171.

The sandwiching members 170 are arranged on the outer sides of the battery cells 20 that are located on the outermost sides of the plurality of battery cells 20 in the front-rear direction. That is, in the front-rear direction (in the alignment direction of the battery cells 20), one of the sandwiching members 170 is arranged on the front side of the battery cell 20 that is located on the most front side, and the other of the sandwiching members 170 is arranged on the rear side of the battery cell 20 that is located on the most rear side. Each of the sandwiching members 170 of this embodiment has an end plate 172 and a reinforcing member 173.

The end plate 172 expands in a direction orthogonal to the front-rear direction, and has a size and a shape such that it covers substantially the whole battery cell 20 in front view. The end plate 172 is a molded metal plate that is formed using an iron-based metal material and is subjected to zinc metal plating. A plurality of reinforcing parts 172a, such as ribs, projections, and bent portions, are formed on the end plate 172.

The end plate 172 has a plurality (two in an example of this embodiment) of second engaging parts (positioning part) 32 in a region overlapping the insulating member 171 and the reinforcing member 173 in the front-rear direction. The second engaging parts 32 constitute part of coupling parts 30 configured to couple the end plate 172, the reinforcing member 173, and the insulating member 171 to one another. The coupling parts 30 and the second engaging parts 32 will be described in detail below.

The reinforcing member 173 expands in a direction orthogonal to the front-rear direction, and has a size and a shape such that it covers part of the end plate 172 in front view. The reinforcing member 173 is a molded metal plate that is formed using an iron-based metal material and is subjected to zinc metal plating. The reinforcing member 173 of this embodiment extends along a diagonal line of the end plate 172. A plurality of reinforcing parts 173a, such as ribs, projections, and bent portions, are formed on the reinforcing member 173.

The reinforcing member 173 has a plurality (two in an example of this embodiment) of third engaging parts (positioning parts) 33 in a region overlapping the insulating member 171 and the end plate 172 in the front-rear direction (specifically, at positions corresponding to the second engaging parts 32 of the end plate 172). The third engaging parts 33 constitute part of the coupling parts 30. The third engaging parts 33 will be described in detail below.

In the end plate 172 and the reinforcing member 173 configured as above, the arrangement positions, shapes, etc., of the respective reinforcing parts 172a and 173a are set so that the end plate 172 and the reinforcing member 173 have a specific strength when they are coupled (joined) to each other in a stacked state in the front-rear direction. That is, it is possible to ensure a sufficient strength while suppressing the thickness (dimension in the front-rear direction) of the sandwiching member 170 by stacking the plurality of molded plates 172 and 173 on which the plurality of reinforcing parts 172a and 173a are formed in the front-rear direction so as to form the sandwiching member 170, as described above.

The insulating members 171 are formed of a resin, and have insulating properties. The insulating members 171 are arranged between the sandwiching members 170 and the battery cells 20 located on the outermost sides in the front-rear direction. Specifically, one of the insulating members 171 is sandwiched between the sandwiching member 170 arranged on the front side and the battery cell 20 on the most front side, and the other of the insulating members 171 is sandwiched between the sandwiching member 170 arranged on the rear side and the battery cell 20 on the most rear side.

Each of the insulating members 171 expands in a direction orthogonal to the front-rear direction, and has a size and a shape such that it covers the whole battery cell 20 in front view. As shown also in FIG. 4, the insulating member 171 has a body 174 as a plate portion, and a plurality of projecting ridges 175 that project from a surface 174a of the body 174 facing the battery cell 20 and are aligned in parallel to each other at intervals in the up-down direction. Further, the body 174 has a plurality (two in an example of this embodiment) of first engaging parts (positioning parts) 31 in a region overlapping the end plate 172 and the reinforcing member 173 in the front-rear direction (specifically, at positions corresponding to the second engaging parts 32 of the end plate 172 and the third engaging parts 33 of the reinforcing member 173). The first engaging parts 31 constitute part of the coupling parts 30. The first engaging parts 31 will be described in detail below.

Figure 5:
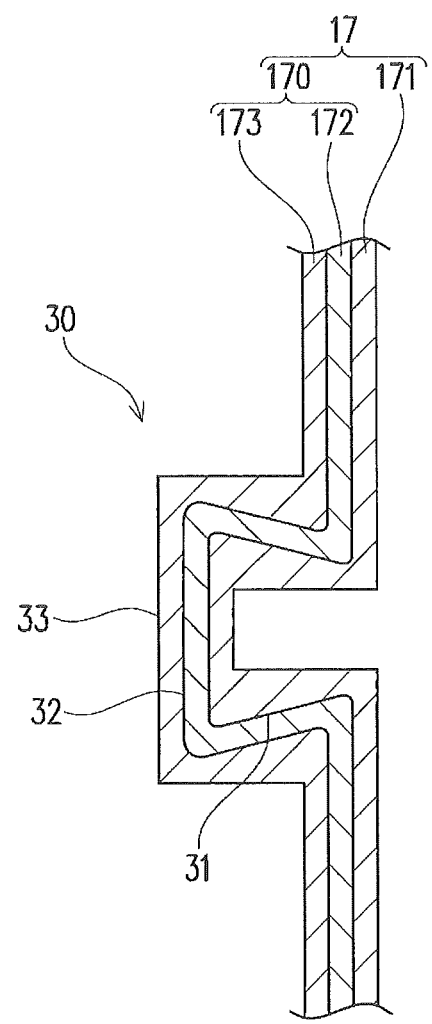
FIG. 5 is an enlarged sectional view of a coupling part at a terminal end of a frame.

The end plate 172, the reinforcing member 173, and the insulating member 171 configured as above are coupled (joined) to one another by a plurality (two in an example of this embodiment) of coupling parts 30 so as to be integrated. As shown in FIG. 5, the coupling parts 30 are formed at portions where the insulating member 171, the end plate 172, and the reinforcing member 173 are stacked in tight contact with one another in the front-rear direction. The coupling parts 30 include the aforementioned first engaging parts 31 of the insulating member 171, the aforementioned second engaging parts 32 of the end plate 172, and the aforementioned third engaging parts 33 of the reinforcing member 173.

In each of the first engaging parts 31, a first surface forms a recess, and the back surface of the first surface forms a projection. Specifically, the first engaging part 31 has a shape in which the surface 174a of the body 174 of the insulating member 171 facing the battery cell 20 is recessed, and the back surface of the recessed surface projects. The first engaging part 31 is fitted into the second engaging part 32.

Specifically, the first engaging part 31 has an annular cross section at positions in the front-rear direction except for its distal end, and the outer diameter thereof increases from the base to the distal end. That is, in the first engaging part 31, the outer circumference (outer diameter) of the distal end is larger than the outer circumference (outer diameter) of the base.

Also in each of the second engaging parts 32, in the same manner as in the first engaging part 31, a first surface forms a recess and the the back surface of the first surface forms a projection. Specifically, the second engaging part 32 has a shape in which a surface facing the insulating member 171 is recessed, and the back surface of the recessed surface projects, at a position of the end plate 172 overlapping the first engaging part 31 in the front-rear direction. In the second engaging part 32, the first engaging part 31 is fitted into the recessed portion, and the projecting portion is fitted into the third engaging part 33.

Specifically, the second engaging part 32 has an annular cross section at positions in the front-rear direction except for its distal end, and the outer diameter thereof increases from the base to the distal end. That is, in the second engaging part 32, the outer circumference (outer diameter) of the distal end is larger than the outer circumference (outer diameter) of the base, and the inner circumference (internal diameter) of the distal end is larger than the inner circumference (internal diameter) of the base. Further, the inner circumference (internal diameter) of the base of the second engaging part 32, that is, the opening of the recessed portion is smaller than the outer circumference (outer diameter) of the distal end of the first engaging part 31. In this embodiment, the recessed portion of the second engaging part 32 is in tight contact with the first engaging part 31 fitted into the recessed portion.

Also in each of the third engaging parts 33, a first surface forms a recess, and the back surface of the first surface forms a projection, in the same manner as in the first and second engaging parts 31 and 32. Specifically, the third engaging part 33 has a shape in which a surface facing the end plate 172 is recessed, and the back surface of the recessed surface projects, at a position of the reinforcing member 173 overlapping the second engaging part 32 in the front-rear direction. In the third engaging part 33, the second engaging part 32 is fitted into the recessed portion.

Specifically, the third engaging part 33 has an annular cross section at positions in the front-rear direction except for its distal end, and the outer diameter thereof increases from the base to the distal end. That is, in the third engaging part 33, the outer circumference (outer diameter) of the distal end is larger than the outer circumference (outer diameter) of the base, and the inner circumference (internal diameter) of the distal end is larger than the inner circumference (internal diameter) of the base. Further, the inner circumference (internal diameter) of the base of the third engaging part 33, that is, the opening of the recessed portion is smaller than the outer circumference (outer diameter) of the distal end of the second engaging part 32. In this embodiment, the recessed portion of the third engaging part 33 is in tight contact with the second engaging part 32 fitted into the recessed portion.

Each of the coupling parts 30 that is composed of the first to third engaging parts 31 to 33 configured as above is formed by partially pressing (pressure molding) the three members (the insulating member 171, the end plate 172, the reinforcing member 173) in a stacked state at a time. Specifically, it is formed as follows.

Figure 6:
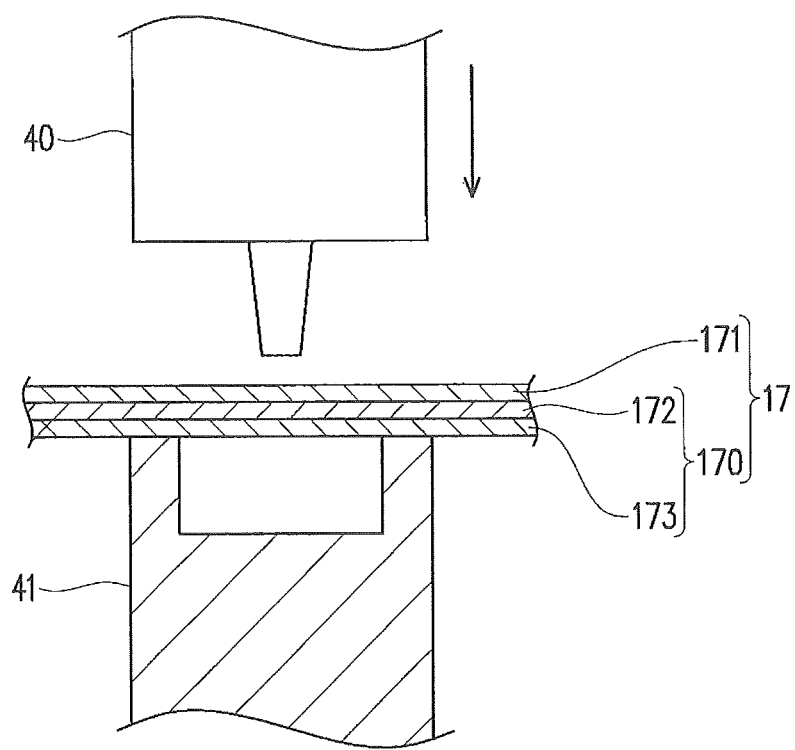
FIG. 6 is a view explaining a forming step of the coupling part, showing the state before pressing.
Figure 7:
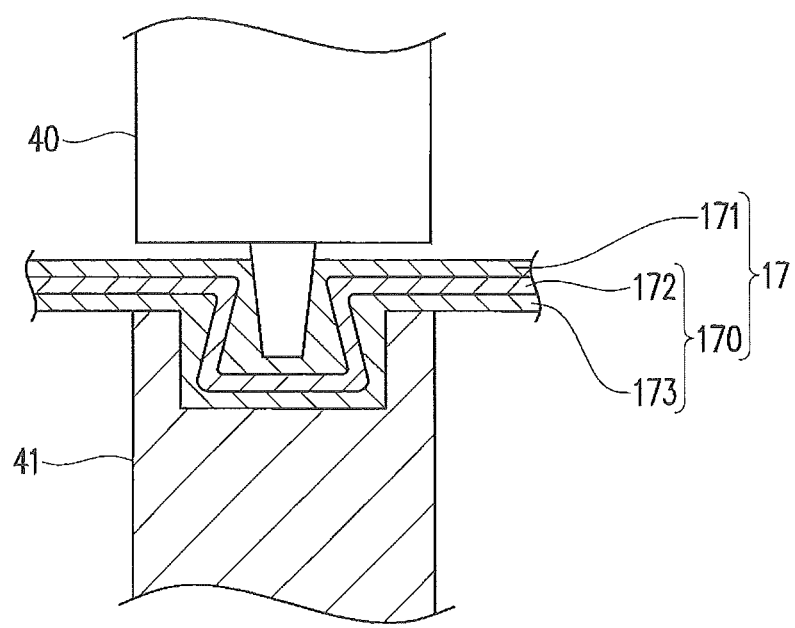
FIG. 7 is a view explaining the forming step of the coupling part, showing the state during pressing.

As shown in FIG. 6, the insulating member 171, the end plate 172, and the reinforcing member 173 are sequentially stacked. Subsequently, as shown in FIG. 7, a pair of plastic molds 40 and 41 sandwich part of the coupling part 30 (planned formation portion) of the insulating member 171, the end plate 172, and the reinforcing member 173 in a stacked state so as to press it. This allows plastic deformation of the pressed portions of the members (the insulating member 171, the end plate 172, and the reinforcing member 173), so that the coupling part 30 is formed. That is, the first to third engaging parts 31 to 33 are integrally formed while being engaged with one another at a time by press molding.

According to a battery module 10 configured as above, the engaging part of one (for example, the first engaging part 31 of the insulating member) of adjacent members (the insulating member 171 and the end plate 172, or the end plate 172 and the reinforcing member 173) is inserted into the engaging part of the other member (for example, the second engaging part 32 of the end plate 172), thereby allowing the members 171, 172, and 173 to be easily positioned relative to one another when forming the abutment 17 as a terminal end of the frame 16. As a result, the assembly of the battery module 10 is facilitated.

The members (the insulating member 171, the end plate 172, and the reinforcing member 173) constituting the abutment 17 of this embodiment respectively have a plurality of engaging parts 31, 32, and 33. Thus, the engaging parts of one (for example, the first engaging parts 31) of adjacent members (the insulating member 171 and the end plate 172, or the end plate 172 and the reinforcing member 173) are inserted respectively into their corresponding engaging parts of the other member (for example, the second engaging parts 32), thereby determining the relative attitude of the members 171, 172, and 173 to one another. Therefore, the assembly of the battery module 10 can be more facilitated. That is, of the adjacent members 171 and 172 (or 172 and 173), the projections of the plurality of the engaging parts 31 (or 32) of the other member 171 (or 172) which correspond to the recesses of the plurality of engaging parts 32 (or 33) of one member 172 (or 173) are respectively inserted into the recesses, thereby makes it possible to prevent the relative rotation of the members 171 and 172 (or 172 and 173) to each other about a single recess and the projection fitted into the recess. This can further facilitate the assembly operation.

In the battery module 10 of this embodiment, of the plurality of members that constitute the abutment 17, the member that is located on the most battery cell 20 side is an insulating member made of resin. Therefore, the battery cell 20 can be insulated from the end plate 172 and the reinforcing member 173 which are made of metal.

Further, in the abutment 17 of this embodiment, it is difficult for the distal end of the first engaging part 31 fitted into the second engaging part 32 to pass through the opening of the second engaging part 32, and it is difficult for the distal end of the second engaging part 32 fitted into the third engaging part 33 to pass through the opening of the third engaging part 33. Therefore, the three members (the insulating member 171, the end plate 172, and the reinforcing member 173) coupled (joined) to one another by the engaging parts 31, 32, and 33 can be handled as a single part. This can facilitate the assembly of the battery module 10. That is, the battery module 10 of this embodiment allows a plurality of members made of different materials (the end plate 172 and the reinforcing member 173 made of metal, and the insulating member 171 made of resin) to be integrally handled with a simple configuration such as the first to third engaging parts 31 to 33, thereby achieving the ease of assembly, while ensuring the strength by forming a pair of sandwiching members 170 (the end plate 172 and the reinforcing member 173) that sandwich the plurality of battery cells 20 using thin members (molded plates) made of metal so as to prevent an increase in size of the battery module 10.

Further, the battery module 10 of this embodiment can suppress the looseness between the joined members 171 and 172 (or 172 and 173), since the first to third engaging parts 31 to 33 are integrally formed by press molding. Further, the engaging parts 31, 32, and 33 constituting the common coupling part 30 are formed at a time by press molding, and therefore the relative position can be suppressed from deviating, for example, due to manufacturing errors, as compared to the case where the engaging parts 31, 32, and 33 are respectively formed by separate steps for the members 171, 172, and 173.

It is a matter of course that the electric storage apparatus of the present invention is not limited to the above described embodiments, and various modifications can be made without departing from the gist of the present invention.

Figure 8A:
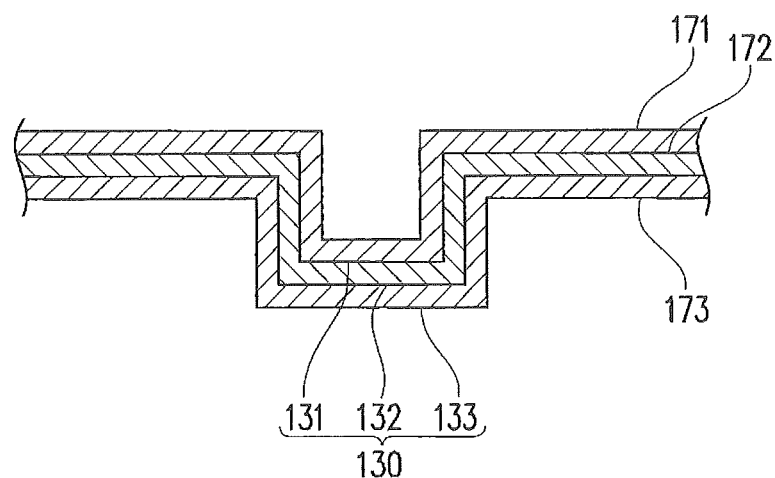
FIG. 8A is a sectional view of a coupling part composed of a plurality of engaging parts having the same diameter throughout from the base to the distal end.
Figure 8B:
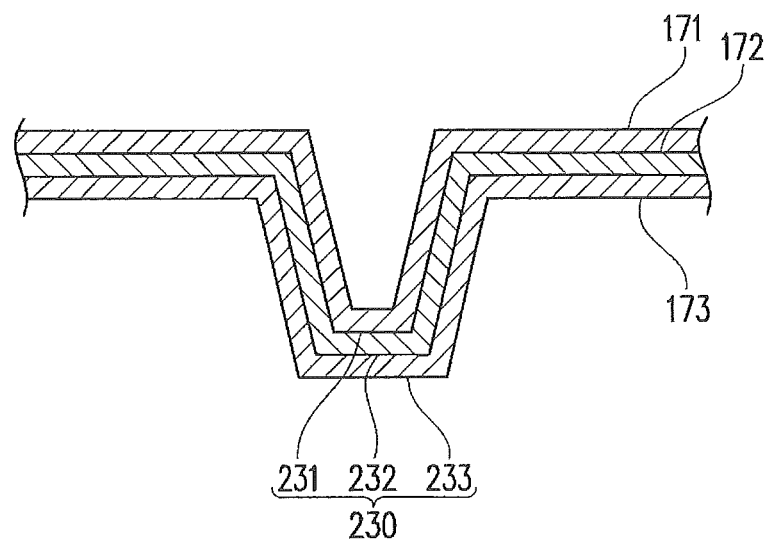
FIG. 8B is a sectional view of a coupling part composed of a plurality of engaging parts having a diameter decreasing from the base to the distal end.

In the above described embodiments, each of the engaging parts 31, 32, and 33 has a surface on the projection side (hereinafter, may be referred to simply as "projections") with a diameter increasing toward the distal end, and each of the engaging parts 31, 32, and 33 has a surface on the battery cell 20 side (hereinafter, may be referred to simply as "recesses") with a diameter increasing toward the rear side. However, there is no limitation to such a shape. As shown in FIG. 8A, each of engaging parts 131, 132, and 133 constituting a coupling part 130 may have an inner circumferential surface and an outer circumferential surface of a circular cylindrical shape arranged concentrically with each other. Further, as shown in FIG. 8B, each of engaging parts 231, 232, and 233 constituting a coupling part 230 may have an inner circumferential surface and an outer circumferential surface with a diameter decreasing toward the distal end. Either of these configurations allows the members 171, 172, and 173 to be easily positioned relative to one another when forming the abutment 17 as a terminal end of the frame 16 by inserting the engaging part of one (for example, the first engaging part 131 of the insulating member) of adjacent members (the insulating member 171 and the end plate 172, or the end plate 172 and the reinforcing member 173) into the engaging part of the other member (for example, the second engaging part 132 of the end plate 172).

The insulating member 171, the end plate 172, and the reinforcing member 173 of the above described embodiment are joined (coupled) to one another by the first engaging parts 31, the second engaging parts 32, and the third engaging parts 33 that are formed while being engaged with one another at a time by press molding. However, there is no limitation to such a configuration. For example, it is also possible to form the abutment 17, after the engaging parts 31, 32, and 33 are respectively formed on the members 171, 172, and 173, by engaging the engaging parts 31 and 32 (or 32 and 33) that correspond to each other (that is, by inserting the projection of one member into the recess of the other member).

Further, in the battery module 10 of the above described embodiment, the relative positioning of the three members 171, 172, and 173 to one another using the first to third engaging parts 31 to 33 is performed in the abutments 17 that sandwich the plurality of battery cells 20 from the front and rear sides. However, such positioning may be performed in other portions of the battery module 10.

Figure 9:
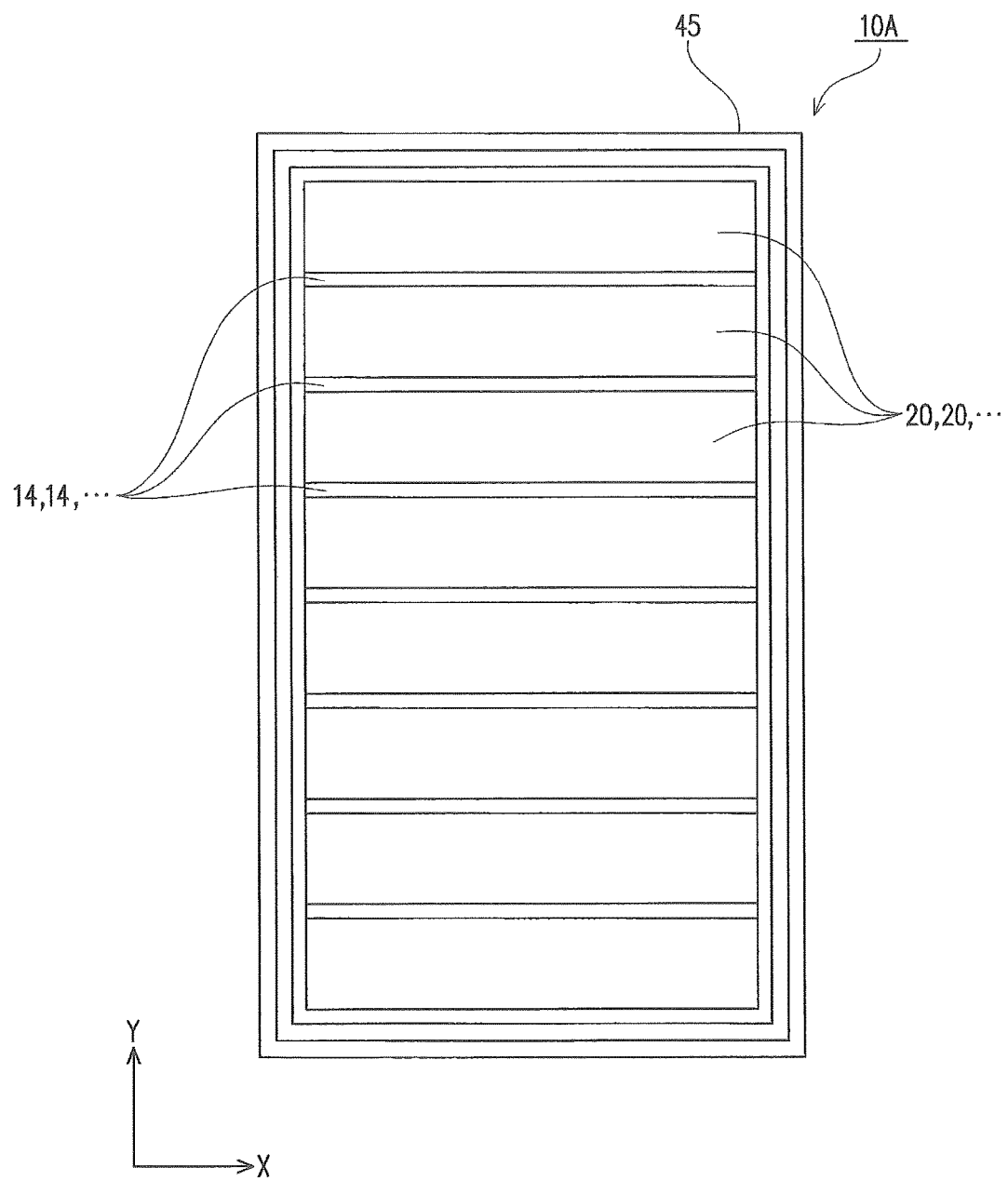
FIG. 9 is a schematic diagram of a battery module according to another embodiment.
Figure 10:
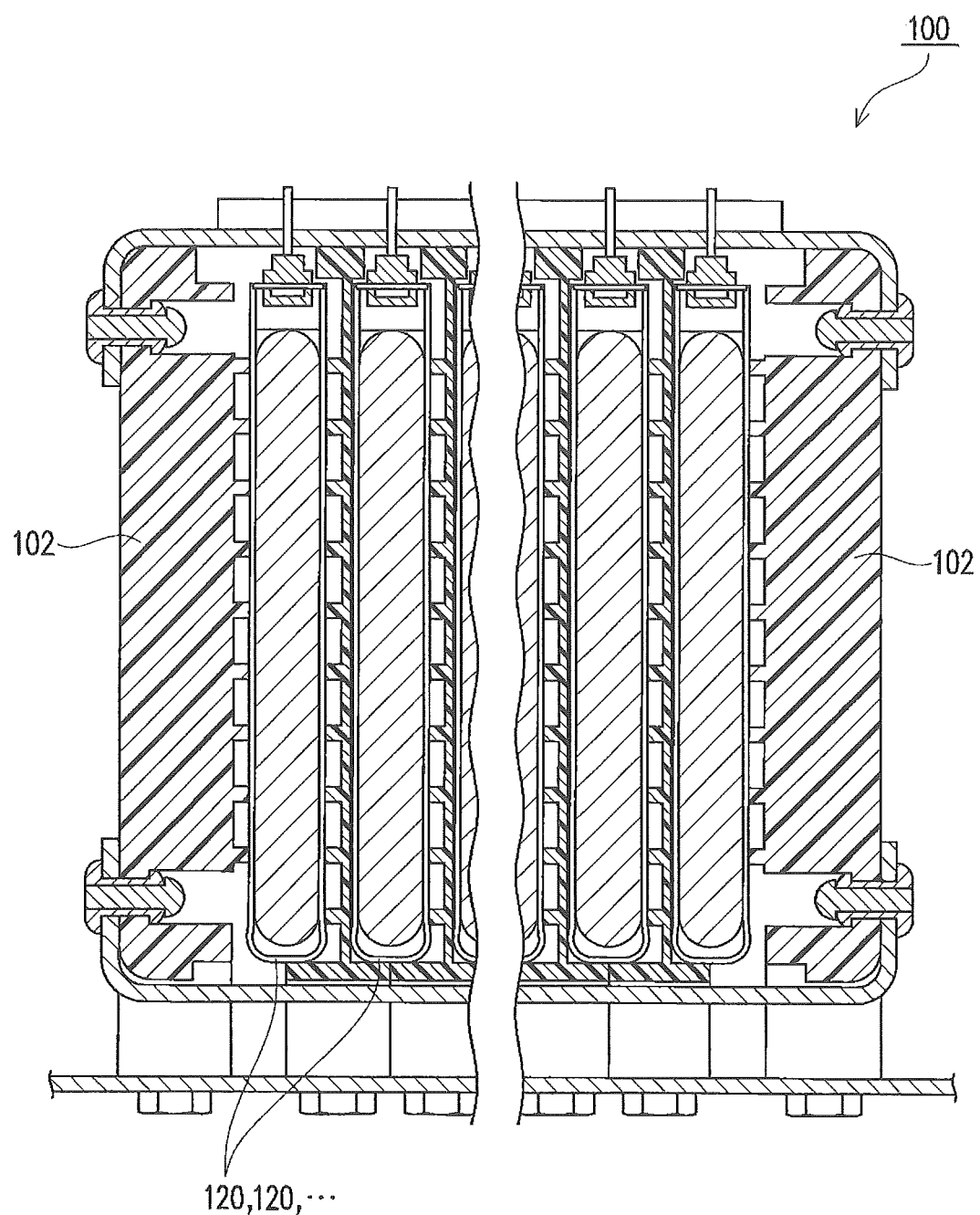
FIG. 10 is a schematic sectional view of a conventional electric storage apparatus.

For example, as the battery module 10A shown in FIG. 9, in the case where the plurality of battery cells 20 are housed in a case 45, and the side walls on the left and right sides, the top wall, and the bottom wall of the case 45 are each formed by stacking three or more members together, members may be positioned relative to one another using the engaging parts in at least one of the side walls, the top wall, and the bottom wall.

Further, in the case where the spacer 14 arranged between the battery cells 20 is formed by stacking three or more members together, these three or more members may be relatively positioned to one another using the aforementioned engaging parts 31, 32, and 33.

Further, the abutment 17 of the frame 16 of the above described embodiment is formed by stacking the three members 171, 172, and 173 together. However, there is no limitation to such a configuration. The abutment 17 may be formed by stacking four or more members together.

The electric storage apparatus and the method for producing an electric storage apparatus of this embodiment are as described above. However, the present invention is not limited to the above described embodiments, and the design can be appropriately modified within the scope intended by the present invention. The operational advantage of the present invention is also not limited to the foregoing embodiments.

The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

What is claimed is:

1. An electric storage apparatus, comprising: a plurality of electric storage devices which are arranged in a first direction; and an abutment arranged in alignment with, and disposed on both ends of the electric storage devices in the first direction, wherein each of the abutments includes at least three members stacked in the first direction, wherein each of the members includes a positioning part including a first surface forming a recess recessed in the first direction and a back surface of the first surface forming a projection projecting opposite to the plurality of electric storage devices, in the first direction, wherein the positioning parts of the members are arranged at positions corresponding to one another such that a first one of the positioning parts, a second one of the positioning parts, and a third one of the positioning parts are sequentially arranged in the first direction, wherein adjacent members are relatively positioned by inserting a positioning part of one of the adjacent members into a positioning part of an other of the adjacent members, wherein the first one of the positioning parts that is arranged on a side closest to the electric storage devices includes an insulating member, and the second one of the positioning parts and the third one of the positioning parts comprise a metal including a molded metal plate subjected to a metal plating, and wherein, in the first direction, the second one of the positioning parts is disposed between the recess of the first one of the positioning parts and the recess of the third one of the positioning parts of the members.

2. The electric storage apparatus according to claim 1, wherein said each of the members comprising the metal includes a metal plating layer on its surface.

3. The electric storage apparatus according to claim 1, wherein a projecting surface of a positioning part of the insulating member is fitted into a recessed surface of a positioning part of one of the members comprising the metal that is adjacent to the insulating member.

4. The electric storage apparatus according to claim 1, wherein the recess of the positioning part of one of the adjacent members has a recess-side portion, on a bottom side, with an inner circumference larger than an opening of the recess, and wherein the projection of the positioning part of the other of the adjacent members has a projection-side portion, on a distal end side of the projection, with an outer circumference larger than the opening, the projection-side portion being arranged inside the recess-side portion.

5. The electric storage apparatus according to claim 1, wherein the positioning parts are formed by partially pressure molding the at least three members in a stacked state at a time.

6. The electric storage apparatus according to claim 1, wherein the metal plating includes a zinc metal plating.

7. The electric storage apparatus according to claim 1, wherein one of the second one of the positioning parts and the third one of the positioning parts extends with a constant thickness through the recess of another one of the second one of the positioning parts and the third one of the positioning parts.

* * * * *